United States Patent [19]

Breckner

[11] Patent Number: 4,739,926

[45] Date of Patent: Apr. 26, 1988

[54] PROCESS FOR THE CONTROL OF AT LEAST TWO PROCESS ENTITIES

[75] Inventor: Kurt Breckner, Waiblingen, Fed. Rep. of Germany

[73] Assignee: Eckardt AG, Stuttgart, Fed. Rep. of Germany

[21] Appl. No.: 45,567

[22] Filed: May 4, 1987

[30] Foreign Application Priority Data

May 15, 1986 [DE] Fed. Rep. of Germany ....... 3616369

[51] Int. Cl.$^4$ .................. F24D 3/00; G05D 15/00
[52] U.S. Cl. ..................................... 237/8 R; 165/39; 236/78 D
[58] Field of Search .............. 165/2, 39, 13; 236/1 R, 236/18, 78 D; 62/203, 179; 237/8 R; 126/419

[56] References Cited

U.S. PATENT DOCUMENTS 3,555,251 1/1971 Shavit .............................. 165/13 X

FOREIGN PATENT DOCUMENTS 3444706 6/1986 Fed. Rep. of Germany ..... 237/8 R
0024797 2/1983 Japan ..................................... 165/39

Primary Examiner—William E. Wayner
Attorney, Agent, or Firm—Burns, Doane, Swecker & Mathis

[57] ABSTRACT

In a technological process two liquids are available for heating purposes, of which the warmer one is to be chosen. For this purpose, the temperature of the two liquids is measured and the flow of the two liquids is controlled as a function of the temperatures by means of actuators. This control is carried out such that at a temperature of the colder liquid which is much lower than the temperature of the warmer liquid, the latter flow is utilized. When the temperature of the colder liquid approaches the temperature of the warmer liquid, the actuator for the colder liquid is slowly opened. In the case of equal liquid temperatures, both actuators are fully opened. If the temperature of the former colder liquid exceeds that of the former warmer liquid, the actuator of the formerly warmer liquid is slowly closed, while the actuator of the formerly colder liquid remains fully open. Sudden large temperature variances of the heating liquid are thereby avoided.

7 Claims, 3 Drawing Sheets

PROCESS FOR THE CONTROL OF AT LEAST TWO PROCESS ENTITIES

BACKGROUND AND SUMMARY OF THE INVENTION

The invention concerns a process for the control or regulation of at least two process entities, wherein a parameter of one of the two process entities is measured and compared with a reference value, and wherein the second process value becomes larger than the first process value if the measured value exceeds the reference value.

In process technology it is frequently necessary to chose between two process entities, for example, to switch for cooling purposes from a warmer liquid to a colder liquid. Such switching procedures lead to an unsteadiness of the process; in the example cited, they cause undesirable temperature jumps.

It is the object of the invention to reduce the unsteadiness appearing upon switching between different process entities.

This object is attained in that the first process entity is maintained constant and the second process entity is increased by a rising measured value, if the measured value is smaller than the reference value but larger than a given lower value; and the second process entity is maintained constant and the first process entity is reduced by a rising, measured value, if the measured value is larger than the reference value, but smaller than a given upper value.

In the afore-mentioned example, the volume flowing through of the warmer liquid is increased with decreasing differences between the temperature of the warmer liquid and the colder liquid. If the temperature of the formerly colder liquid exceeds the temperature of the formerly warmer liquid, the volume flowing through of the formerly colder liquid is decreased with increasing differential between the two temperatures. In this manner, a transition from one process entity to the other process entity, i.e., a replacement of one cooling liquid by the other is obtained in which only a slight unsteadiness of the cooling temperature occurs.

In the present invention a parameter of the other process entity is measured as the given value. It is convenient to measure the same parameter of the individual process entities. It is possible in this manner to take into consideration any potential parameter variations of the two entities. In the afore-mentioned example, the temperatures of the two liquids are measured and the colder liquid selected for cooling.

It is further advantageous if the variation of one process entity is a function of at least one measured value. The manner in which a process entity is increased or reduced is thus effected as a function of one parameter of the process entities. In the example mentioned, the warming cooling liquid is reduced linearly, e.g., its temperature is higher than that of the other liquid. The rise in the linear reduction depends on the difference of the temperatures of the two liquids.

THE DRAWINGS

The objects and advantages of the invention will become apparent from the following detailed description of a preferred embodiment thereof in connection with the accompanying drawings, in which like numerals designate like elements, and in which.

DETAILED DESCRIPTION OF A PREFERRED EMBODIMENT OF THE INVENTION

Figure 1:
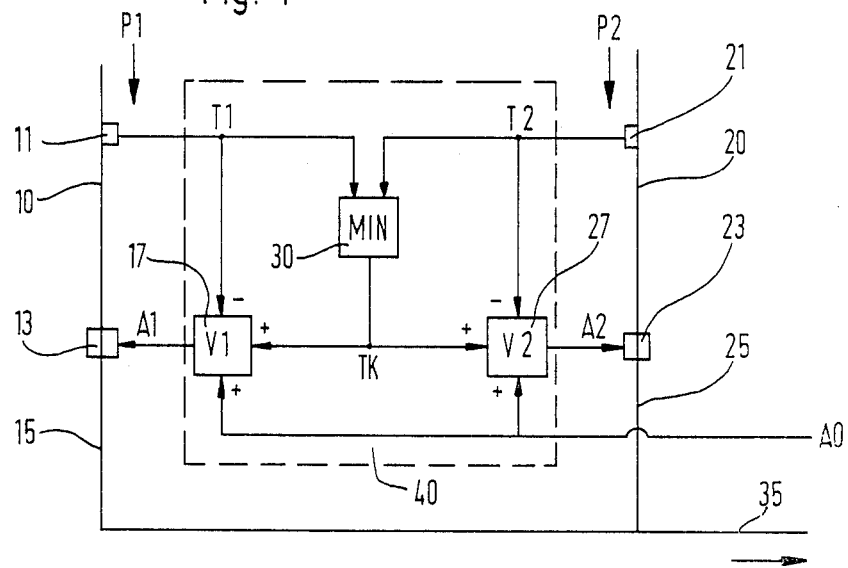
FIG. 1 is a schematic view of a control for the switching of two process entities.

In the case of the control shown in FIG. 1, a process entity P1 is conducted by means of a feeder 10 to an actuator 13. Correspondingly, a process entity P2 is conveyed to an actuator 23 by means of a feeder 20. A parameter T1 and T2 of each of the process entities P1 and P2 is me-asured-with the aid of a sensor 11, 21, wherein the sensors 11, 21 are located ahead of or upstream of the actuators 13, 23. The actuators 13, 23 are followed by lines 15, 25 which are combined at a common outlet 35.

The parameters T1 and T2 are conducted to a control device 40. The control device 40 contains a computer element 17, a computer element 27 and a minimal selection stage 30. The minimal selection stage 30 is charged with the two parameters T1 and T2 and produces from them a reference signal TK always corresponding to the smaller of the two parameters T1 and T2. The computer element 17 receives the parameter T1, the signal TK and a signal $A_0$ and produces from them a control value A1, which is transmitted to the actuator 13. Correspondingly, the computer element 27 forms from the parameter T2, the signal TK and the signal $A_0$ a control value A2 which is conducted to the actuator 23.

The following equations are valid for the computing elements 17, 27:

$$A1 = A_0 + V1 \, (TK - T1),$$

$$A2 = A_0 + V2 \, (TK - T2).$$

The values V1 and V2 are the amplification factors of the two computing elements 17, 27 which may be set to certain values. The value $A_0$ is an actuating signal which may be a predetermined constant or which may be varied, for example by a superposed regulation.

Figure 2:
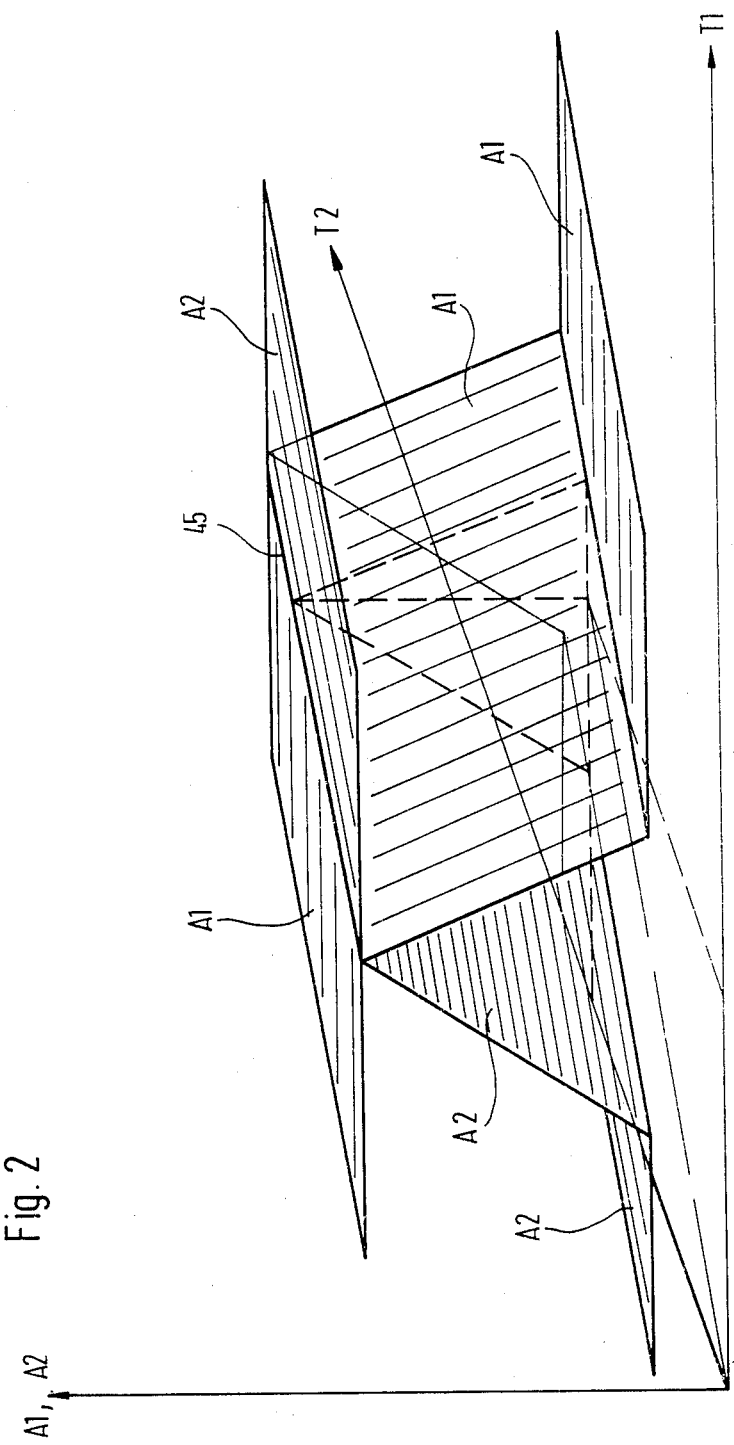
FIG. 2 is a diagram representing the switching of the two process entities of FIG. 1 with the aid of control values as a function of parameters of the process entities.

The control values A1 and A2 are entered in FIG. 2 over the parameters T1 and T2. The individual values of the control values A1 and A2 form downwardly inclined surfaces which intersect along a straight line 45. At a certain parameter T2 the three-dimensional view of FIG. 2 becomes the two-dimensional view of FIG. 3.

Figure 3:
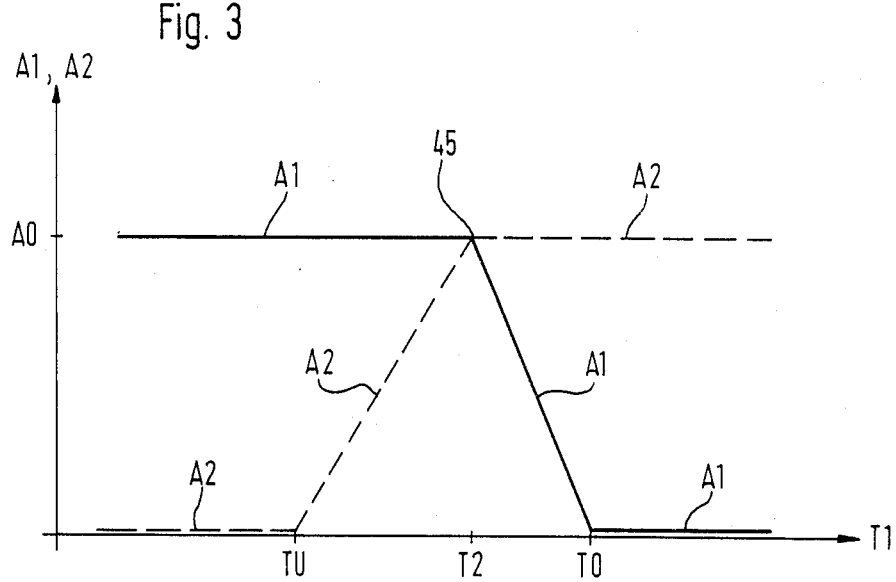
FIG. 3 is a two-dimensional diagram corresponding to a section of the diagram of FIG. 2 at a certain value of the two parameters.

In FIG. 3 the control values A1 and A2 are entered over the parameter T1, while the parameter T2 is constant. The breaking straight line 45 of FIG. 2 becomes a point of intersection 45 in FIG. 3.

If T1 is smaller than T2, TK=T1. From the above-cited equation then, $A1 = A_0$. This corresponds to the left upper part of the configuration of the control value A1 in FIG. 3.

If T1 is larger than T2, TK=T2. It then follows that $A1 = A_0 + V1(T2 - T1)$. This configuration of the control value A1 corresponds to the center portion of FIG.

3 in which the value A1 is provided with a negative slope. The negative slope is the result of the fact that the parameter T1 is larger than the parameter T2.

According to FIG. 3, the control value A1 intersects the abscissa provided with the parameter T1 at an upper value T0. For this value the following equation is valid: $T0 = T2 + A_0/V1$. The upper value T0 may thus be adjusted by means of the amplification factor V1.

According to the equation for the control value A1, the latter would have a negative slope even for T1 parameter values larger than T0. As, however, the control value A1 cannot become negative, $A1 = 0$ if T1 is larger than T0. This is shown in the lower right area of FIG. 3.

According to the first mentioned equation, the following is valid for T1 parameter values smaller than T2: $A2 = A_0 + V2(T1 - T2)$. This variation of the control value A2 corresponds to the center area of FIG. 3, in which the control value A2 has a positive slope.

Since, however, the control value A2 cannot become negative, in the lower left area of FIG. 3 the control value A2 is equal to zero. The transition from $A2 = 0$ to a positively rising A2 takes place exactly when T1 corresponds to a lower value TU. For this lower value: $TU = T2 - A_0/V2$.

If T1 is larger than T2, the initial equation yields the following for the control value A2: $A2 = A_0$. This variation of the set value A2 is shown in the upper right area of FIG. 3.

If both parameter values T1 and T2 are equal, the following is valid: $A1 = A2 = A_0$. This corresponds in FIG. 3 to the point of intersection 45.

The transition from the process entity P1 to the process entity P2 is effected as follows:

If the parameter T1 of the process entity P1 is smaller than the lower value TU, the control value A1 affecting the process entity P1 corresponds to the set variable $A_0$, while the control value A2 affecting the process parameter P2 is equal to zero. If the parameter T1 is larger than the lower value TU, but smaller than the parameter T2, the control variable A1 again corresponds to the set variable $A_0$, but the control value A2 increases with a declining differential between the two parameters T1 and T2. If the parameters T1 and T2 are equal, the control variable A2 also corresponds to the set variable $A_0$. If the parameter T1 is larger than the parameter T2, A2 retains the value of $A_0$. The control value A1, on the other hand, is reduced linearly with increasing distances of the parameters T1 and T2 to the value of zero. The control value A1 attains the value of zero exactly when the parameter T1 corresponds to the upper value T0. If the parameter T1 is larger than the upper value T0, the control value A1 is equal to zero.

To reiterate, if the measured value T1 is smaller than the predetermined value T2, but larger than a given lower value TU, then the first process entity P1 is maintained constant and the second process entity P2 is increased by a rising measured value T1. If the measured value T1 is larger than the predetermined value T2, but smaller than a given upper value T0, then the second process entity is maintained constant and the first process entity P1 is reduced by a rising measured value.

Altogether, therefore, by means of the controls shown in FIG. 1 and explained with reference to FIGS. 2 and 3, the process entity whose parameter is smaller, is always set at the value of the set variable $A_0$. The control procedure described may thus be used for example, for cooling purposes, if cooling liquids are utilized as process entities, the temperatures of which are measured as the parameters of the process entities.

Figure 4:
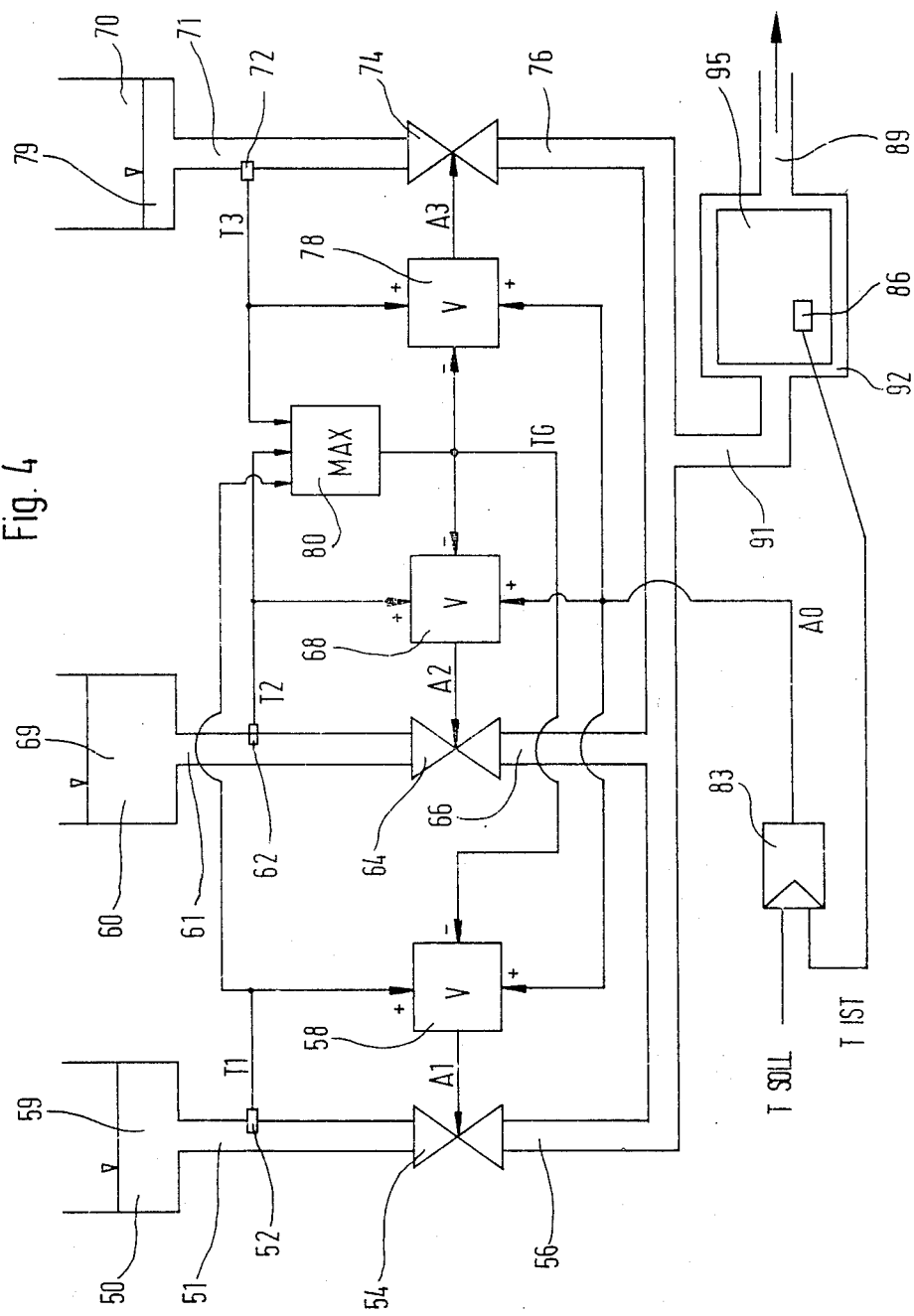
FIG. 4 is a schematic view of a regulation, whereby an object is heated to a predetermined temperature by means of two available liquids.

The system shown in FIG. 4 serves to heat for example, a tempering space 95 or the like. In three vessels 50, 60, 70 the liquids 59, 69, 79 are contained. By means of feeder lines 51, 61, 71, the liquids 59, 69, 79 are each conducted to a valve 54, 64, 74. Temperature sensors 52, 62, 72 are provided to measure the temperatures T1, T2 an T3 in the feeder lines 51, 61, 71. From the valves 54, 64, 74, lines 56, 66, 76 lead to a common line 91. The latter is connected with a vessel 92 or the like, which is equipped with a drain 89. In the vessel 92, the tempering space 95 is located, to which a temperature sensor 86 is applied.

The valves 54, 64, 74 are supplied by the computing elements 58, 68, 78 with the control values A1, A2 and A3. The equations for the three computing elements 58, 68, 78 are as follows:

$$A1 = A_0 + V(T1 - TG),$$

$$A2 = A_0 + V(T2 - TG+), \text{ and}$$

$$A3 = A_0 + V(T3 - TG).$$

The value TG is a maximum temperature signal formed by means of a maximal selection stage 80. The temperature signals T1, T2 and T3 are conducted to the maximal selection stage 80. From these temperature signals, the maximal selection stage 80 forms the signal TG as follows:

$$TG = \text{maximum of } (T1, T2, T3).$$

The signal TG thus always corresponds to the largest of the three temperature signals T1, T2 and T3.

The value $A_0$ is a setting signal that is formed by a regulator 83. The regulator 83 is, in turn, exposed to a desired temperature signal T-SOLL and an actual temperature signal T-IST. The desired temperature signal T-SOLL may be set, for example, by an operator. The actual temperature signal $T = IST$ is formed by the temperature sensor 86 and corresponds to the actual temperature of the tempering space 95.

If the tempering space 95 is to be heated from the available liquids 59, 69, 79 to the desired temperature T-SOLL, in particular by means of the maximal selection stage 80 in keeping with the description of the controls with reference to FIG. 1, the liquid with the highest temperature is selected. The valve associated with this liquid is fully opened, while the other valves remain closed or are opened slightly only. By means of the regulation superposed on the selection control, which essentially comprises the regulator 83, the volume of liquid conducted to the vessel 92 (and thus to the tempering space 95) is set exactly so that the tempering space 95 attains the desired temperature T-SOLL and remains constant. If the temperatures of the liquids 59, 69, 79 vary, the change is taken into account by the selection control. The replacement of individual liquids is carried out in keeping with the description with reference in particular to FIG. 3.

It is, therefore, assured by means of the selection control that in the embodiment of FIG. 4 at any given moment the liquid having the highest temperature is being conveyed to the tempering space 95. The result is that the tempering space 95 may be heated as rapidly as possible to the temperature desired. With the aid of the superposed regulation, the desired temperature of the tempering room 95 is maintained by affecting the volume of the liquid. This leads to the fact that the smallest possible quantity of the liquid is used to heat the tempering space 95.

In a deviation from the embodiments described, it is possible to control or regulate an arbitrary number of process entities. It is further possible to measure different parameters of the process entities, but these must be adapted to each other. The transition between the individual process entities, shown linearly in the examples described, may be carried out by any other function. If, for example, one of several microprocessors or the like, are used as the control device or computing element, the transitions may be carried out almost arbitrarily and differently from each other. Finally, the process described is not restricted to the cooling or heating of tempering spaces, but may be used generally in process technology.

Although the present invention has been described in connection with a preferred embodiment thereof, it will be appreciated by those skilled in the art that additions, modifications, substitutions and deletions not specifically described may be made without departing from the spirit and scope of the invention as defined in the appended claims.

What I claim is:

1. In a process for the control or regulation of at least two process entities, wherein a parameter of a first of the two process entities is measured and compared with a reference value and wherein the second process entity becomes larger than the first process entity when the measured value exceeds the reference value, the improvement wherein:

the first process entity is maintained constant and the second process entity is increased by a rising measured value, if the measured value is smaller than the reference value but larger than a given lower value, and the second process entity is maintained constant and the first process entity is reduced by a rising measured value if the measured value is larger than the reference value but smaller than a given upper value.

2. Process according to claim 1, wherein a parameter of the second process entity is measured as the reference value.

3. Process according to claim 1, wherein the first and the second process entities are equal in magnitude if the measured value is equal to the reference value.

4. Process according to claim 1, wherein the variation of a process entity is dependent on at least one measured value.

5. Process according to claim 1, wherein the variation of a process entity is a function of a superposed regulation.

6. Process according to claim 1, wherein the flow-through quantity of a liquid is provided as the process entity.

7. Process according to claim 6, wherein the temperature of a liquid is provided as the parameter.

* * * * *